Oct. 12, 1971  G. N. CHARTIER  3,611,575
AUTO FRAME ALIGNMENT APPARATUS
Filed April 17, 1969  3 Sheets-Sheet 1
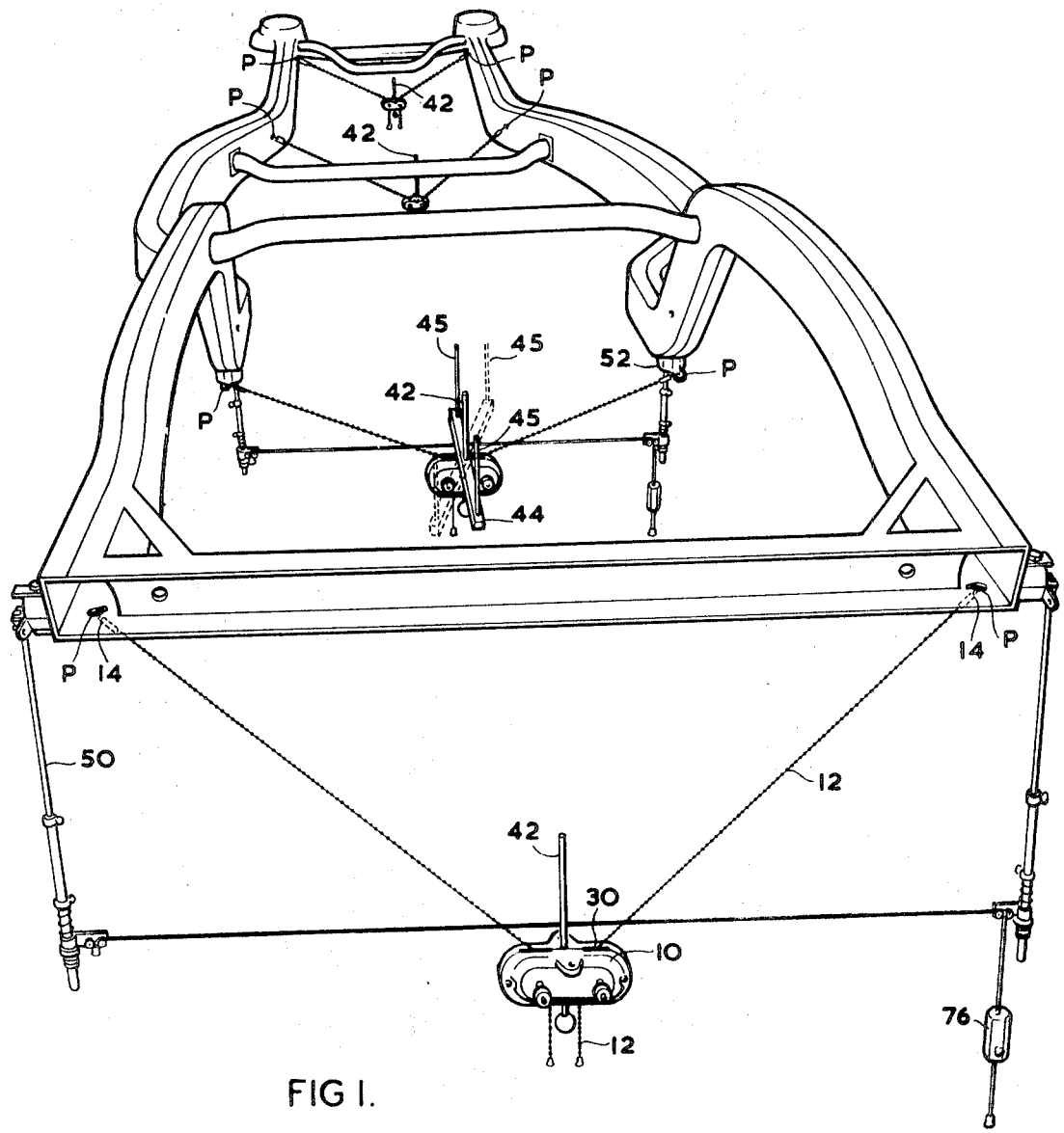
FIG I.
INVENTOR
GUY N. CHARTIER
Westell & Hanley Oct. 12, 1971  G. N. CHARTIER  3,611,575
AUTO FRAME ALIGNMENT APPARATUS
Filed April 17, 1969  3 Sheets-Sheet 2

INVENTOR
GUY N. CHARTIER

Westell & Hanley

Oct. 12, 1971   G. N. CHARTIER   3,611,575
AUTO FRAME ALIGNMENT APPARATUS
Filed April 17, 1969   3 Sheets-Sheet 3

INVENTOR
GUY N. CHARTIER
Westell & Hanley

United States Patent Office 3,611,575
Patented Oct. 12, 1971

3,611,575
AUTO FRAME ALIGNMENT APPARATUS
Guy N. Chartier, Hill, Ontario, Canada, assignor to Guy Chart Tools Limited, Scarborough, Ontario, Canada
Filed Apr. 17, 1969, Ser. No. 817,088
Int. Cl. G01c 15/12
U.S. Cl. 33—46 AT                                  2 Claims

ABSTRACT OF THE DISCLOSURE

A plurality of datum members are sling suspended from respective pairs of locations on a frame which would be equally spaced from the center line and from the front or back of the frame if the frame is symmetrical about a vertical plane therethrough (i.e. if the frame is misaligned). If not, indicators on the datum members demonstrate and locate the misalignment through their relationship to corresponding datum members.

---

This invention relates to means for checking alignment in a motor vehicle car frame.

The invention makes use of a sling suspension for a datum member wherein a body carrying such datum member is suspended by flexible members attached to opposite sides of said frame, with the flexible members being designed to be equal in length and when connected to spaced locations on an approximately horizontal frame, to suspend the datum member in a location intermediate the frame locations. The suspension members are connected to the body, and the body is designed to assume a predetermined orientation when suspended by the two flexible members.

The flexible suspension members and their connection points to the body will in fact define a vertical plane, with the body, to the extent that the suspension points are of equal height, equidistant from the frame attachment points. Thus the datum members will each assume a predetermined orientation relative to the bodies. In the method properly opposed locations on the side members (i.e. locations which would be opposed if the frame is not distorted) are equidistant from a fore and aft plane of symmetry relative to the frame, three or more of such bodies are each suspended between locations on opposite side frame members which locations, in a properly aligned frame, will be equidistant from such plane of symmetry. With three or more of said bodies each suspended between properly opposed locations on opposite sides of the frame and with the length of the flexible members adjusted, if necessary, (as hereinafter described), then, in a properly aligned frame, all such datum members will be located in such vertical fore and aft plane of symmetry. On the other hand if suspension locations on the frame, which should be equidistant from such median vertical plane, are not, then at least one of the three or more of such datum members will be visibly out of the vertical fore-and-aft median plane and by the use of three or more of such datum members, the location of such misalignment along the vehicle frame may be determined.

It will be obvious from the outline of a frame in plan view, that even where the opposed side frame members are equidistant from the fore and aft median vertical plane, the frame may yet be misaligned in that it is a "skew" rather than a rectangular parallelogram that is that one side frame member is displaced forwardly from its opposite member. It will be noted that in such situations, datum members mounted on the body to extend in the plane defined by the flexible suspension members joining properly opposite frame locations, will not show this "skewness." However a second datum member is designed to extend from a body flexibly suspended as aforesaid, horizontally and perpendicular to the plane defined by the flexible suspension members, and such second datum member will show such "skew" misalignment when the frame is "skew" even though datum members on a perpendicular to the line joining the opposed suspension points, will not. Thus such second datum members eccentric with respect to the line joining the right bisectors to the last mentioned line will be provided for mounting on bodies wherever such misalignment is to be checked and such misalignment may thus be detected and corrected.

Means are also shown for measuring the height of various parts of the frame relative to their intended height.

In drawings which illustrate a preferred embodiment of the invention:

FIG. 1 shows a perspective of an automobile frame fore and aft median with plane gauges attached and with the height determining means attached;

FIGS. 2 and 3 demonstrate, in end view relative to the frame, possible attitudes of the median plane gauges;

Figure 6:
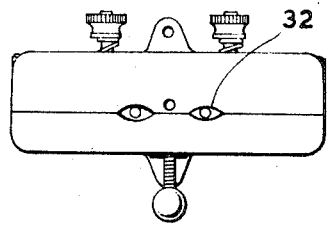
FIG. 6 shows the lower side of the median frame gauge.

In FIG. 1 is shown an automobile frame. The frame will of course be forming a part of the automobile to which it is attached. Thus, it will be assumed, that the frame shown is joined to a body, motor, and wheels which are however omitted here to allow simpler illustration of the invention and its advantages.

Thus the automobile, other than the frame, is omitted for the purposes of explaining the invention, however it will be noted that, where gauges or datum members are shown as attached to the frame, an automobile will allow such attachment, with changes of location for specific automobiles which do not, as will be seen from the following explanation, interfere with the operation of the invention or the attainment of its objects.

The frame shown, along with the automobile to which it is attached, is also assumed to be supported in its approximate driving attitude on a hoist (not shown) or at the least with opposed locations on opposite side members being at approximately equal heights, the support by a hoist in such attitude being an obvious expedient well known to those skilled in the art.

In accord with the preferred embodiment of the invention, the centre line determining member comprises: a body 10 for suspension by a pair of flexible members 12 (here chains) attachable to equivalent locations on or near the side members frame which are opposite in an aligned frame. The alignment of the frame may be determined by a plurality of such pairs of opposite locations, independently of the fact that opposed pairs of locations may be different from front to back along the automobile for various models and makes. Thus, most frames will provide oppositely disposed holes into which hooks 14 on the free ends of chains 12 may be hooked. Where such holes are not available, other means of attachment may be used, connecting hooks 14 to magnetic mounts 52 which strong magnets, now available, may be mounted on any desired location on or near the side frame members.

The chains 12 are adapted to extend equidistantly from the body 10 to hooks 14 (or other suspension means) to hang, like a sling or hammock midway between its suspension points and in an aligned frame, bisected by the fore and aft vertical median plane (the median plane hereafter).

The length of the chain extension from body 10 to hooks 14 is therefore made adjustable, to allow for various widths of automobile and for height adjustment of the sling suspended body and, of course, the adjustment will be such that the lengths of the chain will be maintained equal.

This may be performed in a number of ways, that shown being preferred, where the chain comprises an alternating series of balls 16 and links (not shown) so connected as to form a flexible chain, in a design similar to many lamp pull cords.

Figure 4:
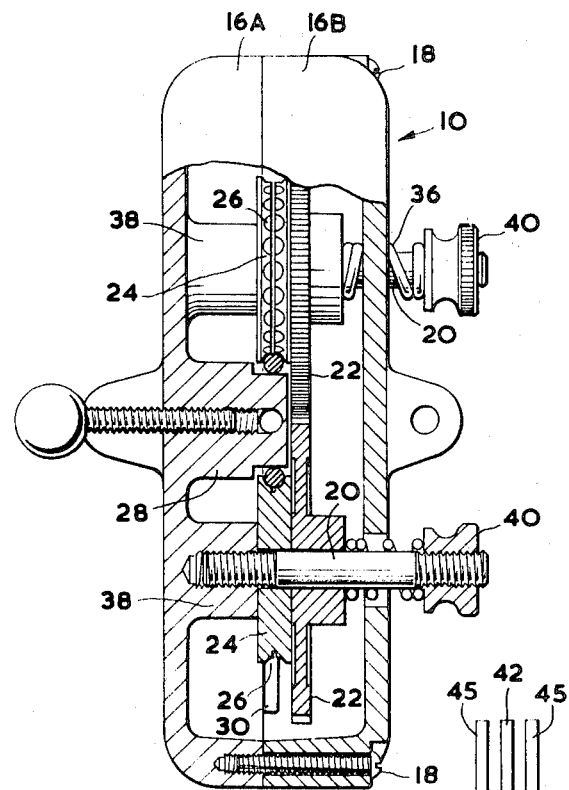
FIG. 4 shows a cross-section of the centre line gauge taken along the line 4—4 of FIG. 2.

The body 10, as shown in FIG. 4 defines a two part housing 16 fastened by balls 18 in which a pair of horizontally disposed parallel shafts 20 are mounted. A gear, 22 preferably of nylon is mounted, within the housing on each such shaft. The gears are of equal diameter and tooth size and are dimensioned relative to the shaft so that the gears mesh and, the gears will always rotate together through the same angular amount.

Each gear is attached to, for rotation with, a coaxial boss 24 which is indented about its radially outward periphery to form sockets 26 for the chain spheres. A stationary boss 28 projects from the side of the housing facing the two bosses, and the boss 28 is shaped to provide surfaces, complementary to and adjacent the periphery of each of the bosses 24 and spaced closely enough thereto to maintain balls 16 in the sockets 26 while allowing movement of the balls with the sockets. Thus longitudinal movement of either chain 12 relative to the body causes rotation of this corresponding boss 24 and gear 22 which causes rotation of the meshing gear 22 and its associated boss 24 extending or retracting the second chain 12 to the same amount as the first. Thus the mechanism described assures that the flexible members (here chains 12) may first be arranged with equal, corresponding extensions to their suspension connections 14, and such equality may be maintained under extension or contraction. The housing is constructed of two joining members 16A and 16B joined approximately along a plane perpendicular to the rotational axes of the gears 22. At least one of the joining edges between members 16A and 16B is recessed to provide a pair of exit slots 30 from the housing which extend generally parallel to the last-mentioned plane. These slots 30 are relatively widely spaced, and are disposed symmetrically about a plane half-way between and parallel to the gear axes of rotation. Apertures 32 are provided on the opposite side of the casing from slots 30 to allow the extension of free ends of chain 12 below the body. The rotation of gears 22 is frictionally opposed to ensure that the body 10 when suspended by chains 12, will not immediately fall under gravity with the chains rotating the gears. To this end, at least one and preferably both shafts 20 are extended outwardly through the casing and the apertures therearound are made sufficiently large that a compression spring 36 may surround the shaft and bear on the gear 22. Thus the shafts 20 must be suspended from housing member 16a on the other side only and this is preferably achieved by screwing the shaft into a threaded bore on an inwardly projecting boss 38 on an appropriate body member. The gear 22 will then be designed to rotate freely on the shaft 20. The free projecting end of each shaft is then provided with a threaded end to which is threadedly attached a knob 40, with the compression spring 36 bearing at one end gear 22 and at the other end on knob 40. The threaded adjustment of knob 40 controls the compression of spring 36 and hence the frictional resistance to rotation by the gear 22. The friction will be adjusted by the knob 40 to ensure that the chains 12 may suspend the body 10 without rotation of the gears under the body gravity but on the other hand, the friction applied will allow normal extension or retraction of the extension chains 12 as desired.

The body 10 is designed so that it will hang from the chains extending through aligned slots 30 and aligned with the chain extents 12 to the suspension points on the frame. The unused extents of chains 12 will extend through the lower end of the body at slots 32. It will be seen that the chains 12 suspending the body and the outer ends of slots 30 will define a plane relative to which body 10 will have a constant orientation.

A post 42 is mounted on the body 10 to project therefrom perpendicular to the line joining the outer ends of slots 30. Thus when the frame suspension points of the chains 12 are horizontal, post 42 will be vertical. It will be seen that this post will extend vertically from the body half-way between the suspension points P when the suspension points are horizontally disposed from one another. For checking a "skew" frame, as heretofore discussed, an arm 44 is provided, mountable on body 10, to extend horizontally in opposite directions from body 10 (for horizontally disposed suspension locations), and perpendicular to the plane defined by the suspending chain extents. At each end of arm 44, posts 45 are mounted to project parallel to post 42.

In operation, a plurality of bodies 10 (at least three and here four) are here disposed, each suspended by equally extending pairs of chains 12 from opposed locations on opposite side frame members and the bodies are spaced from each other longitudinally along the frame.

For the purpose of determining whether the frame sides are aligned from front to rear, the body heights may, since datum posts 42 extend vertically, be adjusted by sight to hang at approximately the same height from the various longitudinally spaced frame locations. (The body members may preferably be adjusted by height measuring means to be discussed hereinafter.)

The height adjustment is accomplished by pulling the chains in one direction or another through the body. The mechanism assures that the extension of chain pairs from a body is equal at all times. With the bodies approximately vertically aligned, if the frame is equidistant from the side frame members, the datum members will all be aligned and only the nearest post 42 to the viewer will be visible as indicated by the solid line location of FIG. 2. On the other hand, if the frame is twisted so that the side frame members are displaced transversely of the frame at a given point, a post 42 at the displacement location will appear out of alignment at that point, as illustrated in dotted form in FIG. 2. By this means a transverse misalignment in a frame may be detected and corrected.

It will be noted that, if one side of the frame is distorted upwardly or downwardly relative to the other, this may be evidenced by the fact that one of the datum posts 42 is tilted with respect to the remainder. However, this misalignment of height is customarily detected in another manner as hereinafter discussed.

The frame side members may, without being transversely displaced from their proper position, still be misaligned in that one side frame member is displaced forwardly or rearwardly relative to the other.

Figures 2, 3:
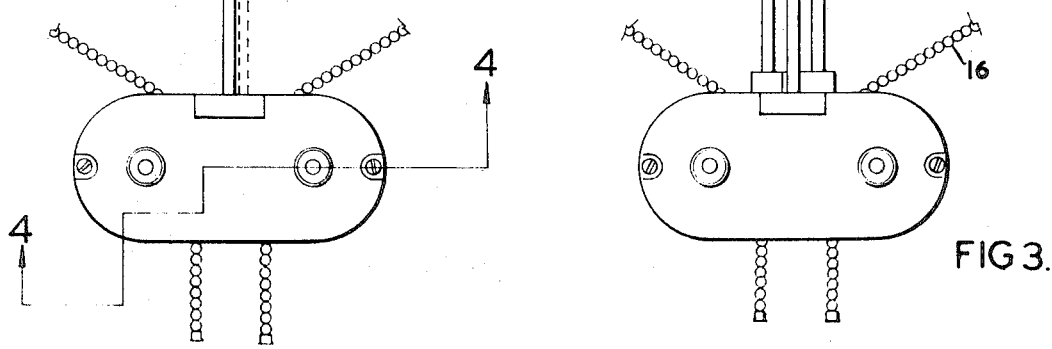

This may be detected for each body location, by attachment of arm 44 to one or more bodies 10 and if the sides of the frame are properly located in a fore and aft direction relative to each other, the two arm mounted datum members 45 and the central datum member 42 will be visually aligned along the fore and aft axis with the line defined by aligned posts 42, and the solid line position of FIG. 2 is representative of this except that the nearest post to the viewer will now be post 42 as the nearest post 42 of FIG. 1 with all posts 44 hidden by post 42. However, where a body 10 is suspended by its chains 12 from locations on or adjacent side frame members which are intended to be opposed but are displaced in a fore or aft direction relative to each other, the arm datums will not align but will appear as indicated in FIG. 3 and in dotted form in FIG. 1. The direction, extent and location of the fore and aft displacement are determined by application of the arm 44 to various bodies 10.

The height of the frame may be determined by the apparatus now to be described. It is noted that the frame may, in accord with hoists and means well known to mechanics, be supported at a location adapted to maintain the frame in its approximate proper attitude (if not misaligned). Such approximation of the proper attitude is sufficient for the apparatus to be hereinafter determined.

Figure 5:
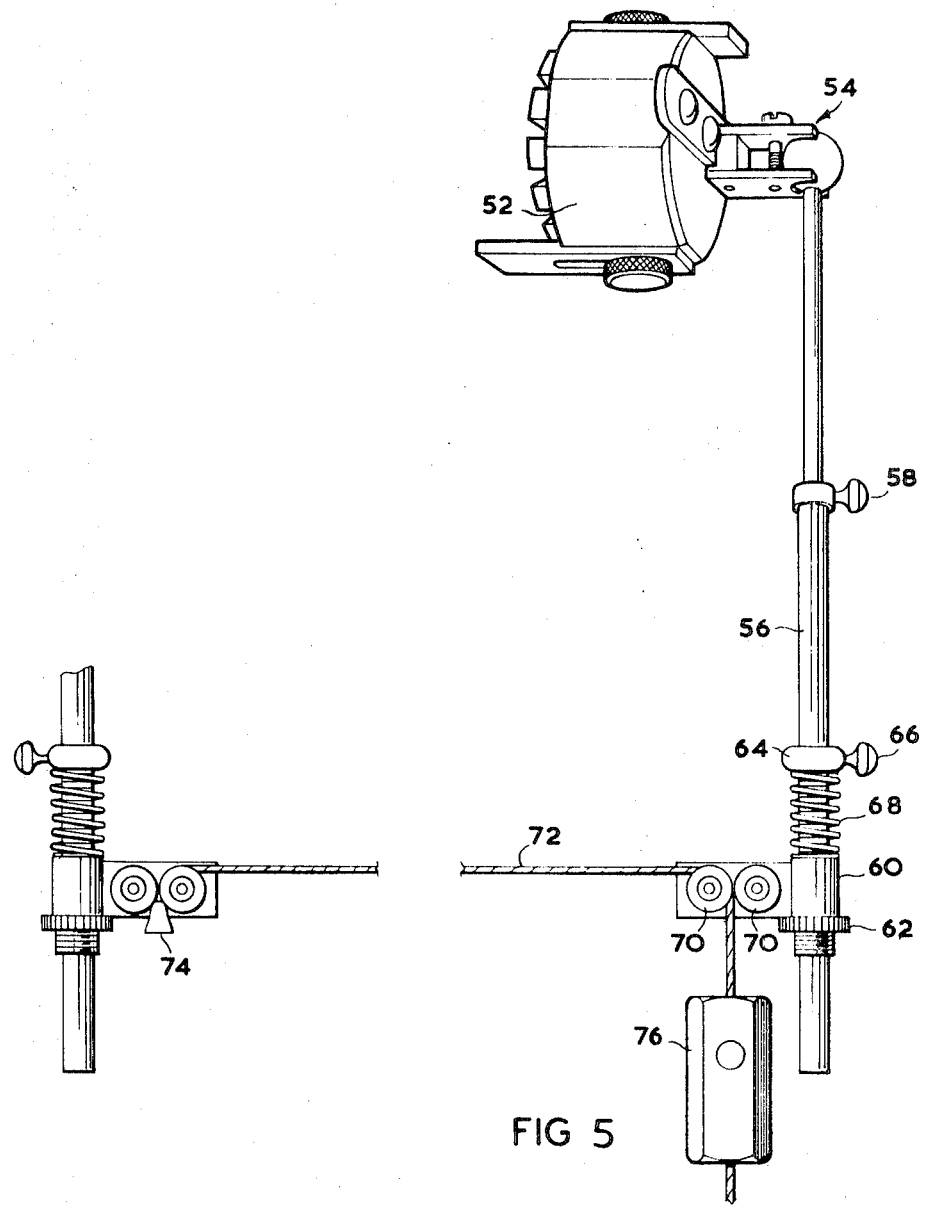
FIG. 5 shows a detail of the height determining gauge.

As shown in FIG. 5, the height determination comprises a plurality of rods 50, mountable on selected opposed locations on the frame to project vertically downwardly. Although such rods may be mounted to project downwardly in any desired manner, the preferred method is to use magnetic attachments 52 shown in FIG. 5 for attachment to either a vertical or horizontal frame surface. In accord with this orientation, a ball and socket clamp 54 is designed to be clamped to have a rod 50 (rigidly attached to the ball) project approximately vertically therefrom and on each rod an outer sleeve 58 downwardly projecting therefrom and telescoping therewith, is attached, adjustable by set screw 58 to various degrees of downward extension. A pulley mount 60 is slidable on the sleeve 56 and held against downward movement thereon by a threaded nut 62 on the sleeve. A ring 64 slidable on the sleeve above member 60 may be fixed on the sleeve by set screw 66. A compression spring 68 bears upwardly on ring 64, and downward by an arm 60 to hold it against nut 62. Thus the height of the arm 60 may be adjusted coarsely by the sleeve adjustment at set screw 58 and finely by the nut 62.

The arms 60, which with their mountings are used in opposed pairs, are each provided with a pair of rollers 70 between which a cord 72 may extend. The cord 72 is provided at one end with a catch 74 too big to pass between the rollers, and at the other end with a weighted bob 76. When the cord 72 is strung between the two pairs of rollers 70 of opposed arms, it is held taut by the bob 76 pulling the cord 72 extending through one pair of rollers 70, through the other, and holding the catch 74 against the second mentioned pair of rollers. For each automobile, there is provided a list of relative heights for various frame locations. With the arms first located to be vertically disposed from opposed pairs of those locations, the listed relative heights may be used as the basis for measurements from the frame to the string and the coarse and fine adjustments of string height (at set screw 59 and 62 respectively) may be made to set the various strings at the listed relative distances from the frame for the locations selected. When this has been performed for the selected arm locations, a fore and aft sight may be taken. If the frame is at the correct height at all locations the strings will be aligned to the sight. Where the frame is distorted to be too high or too low the string corresponding to the location of this distortion will be too high or too low on one or both sides depending on the distortion. Accordingly frame height errors may be detected and corrected.

The height detection means may, of course, also be used as assistance in aligning the bodies 10 for asymmetry and skew detection.

The asymmetry skew and height detections may have to be performed several times as the elimination of an error of one type may contribute an error of another type which will then require correction, and so on.

I claim:
1. Means for establishing the central datum line of an automobile frame comprising:
   a body member;
   means in said body member defining a path therethrough for the passage of each of a pair of flexible members;
   a pair of flexible members extending along each of said paths;
   said two flexible members being designed and constructed to suspend said body along a line traversed to the fore and aft axis of the frame;
   said body member being designed so that movement of one flexible member therethrough along its respective path causes equal movement of the other flexible member therethrough along its respective path;
   means preventing movement of said flexible members relative to said body under the weight of said body when said flexible members are suspending said body;
   means on the free ends of said respective flexible members for attachment to mutually opposite locations on an automobile frame;
   a datum or sighting member, mounted on said body to indicate a locus having a predetermined relationship to the suspension connection of the flexible member to said body.
2. Means as claimed in claim 1 including a datum member providing at least two parallel datum points aligned to lie in a plane perpendicular to the line joining the suspension points of the two flexible members.

References Cited

UNITED STATES PATENTS

| | | | |
|---|---|---|---|
| 2,240,753 | 5/1941 | Bouchard et al. | 33—138 |
| 2,581,021 | 1/1952 | Jacobsen et al. | 33—46(2) |
| 2,713,211 | 7/1955 | Fella | 33—46(2) |
| 3,025,608 | 3/1962 | Hendrix | 33—138 (X) |
| 3,151,396 | 10/1964 | Junkins | 33—46(2) |

WILLIAM D. MARTIN, Jr., Primary Examiner

U.S. Cl. X.R.

33—138, 191, 193